Sept. 12, 1950 G. GUANELLA ET AL 2,522,371

AUTOMATIC FREQUENCY STABILIZATION SYSTEM

Filed April 12, 1947 2 Sheets-Sheet 1

INVENTORS
GUSTAV GUANELLA and
WILLI STEINMANN
BY [signature]
ATTORNEY

INVENTORS
GUSTAV GUANELLA and
WILLI STEINMANN
BY [signature]
ATTORNEY

Patented Sept. 12, 1950 2,522,371

UNITED STATES PATENT OFFICE 2,522,371

AUTOMATIC FREQUENCY STABILIZATION SYSTEM

Gustav Guanella and Willi Steinmann, Zurich, Switzerland, assignors to Radio Patents Corporation, New York, N. Y., a corporation of New York Application April 12, 1947, Serial No. 741,086
In Switzerland April 12, 1946

13 Claims. (Cl. 250—36)

The present invention relates to an arrangement for and a method of stabilizing the mean or center frequency of a frequency modulated high frequency generator, more particularly for stabilizing the generator frequency in accordance with a control frequency supplied by a constant frequency source, such as a piezo-electric oscillator.

According to one known arrangement of frequency control or stabilization, a pair of quadrature or rotary field voltages are produced to operate an electric motor as a result of a deviation of the generated carrier frequency from its assigned value, said motor acting to correct the tuning frequency of the generator in such a sense as to counteract said frequency deviation. This method, however, can be used only in connection with oscillation generators which are subject to relatively slow frequency variations, inasmuch as a mechanically moving element is incapable of following relatively rapid and large center frequency changes due to mechanical inertia and other effects. Furthermore, in known arrangements of this type, a substantial frequency division is required in order to reduce the extent of the frequency deviation. This, in turn, results in a considerable amount of apparatus required.

According to another arrangement known in the art for effecting a purely electrical frequency control, the rotary field voltages mentioned above are utilized for producing an electrical control current or voltage which in turn acts to control the generator frequency in a proper sense to compensate for an initial deviation from the assigned value. This method, however, is not suitable for frequency modulated oscillation generators, as it is fundamentally based upon a phase comparison between the generator frequency and the controlling frequency, and consequently is limited to minute or relatively small frequency deviations.

Accordingly, an object of the present invention is the provision of a novel method of and means for center frequency stabilization of a freqency modulated oscillation generator by means of which the mean or center frequency of the generator is maintained constant independently of the modulation condition, substantially free from the effects of inertia and other mechanical defects.

Another object of the invention is to provide a novel method and system of this type, enabling a frequency control in response to both relatively rapid and large deviations of the generator frequency from its assigned value determined by the frequency of a constant frequency source, such as a piezo-electric oscillator or the like.

The above and further objects and novel aspects of the invention will become more apparent from the following detailed description of a few practical embodiments taken in reference to the accompanying drawings forming part of this specification and wherein.

Figure 1:
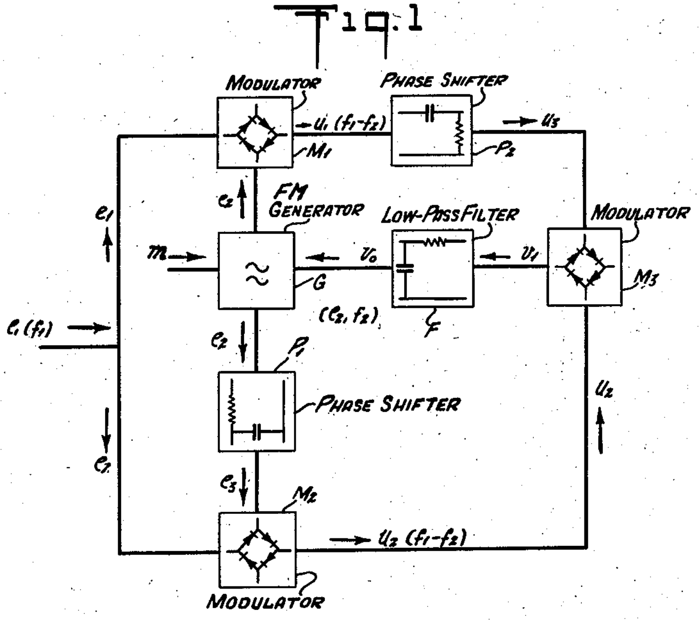
Figure 1 is a block diagram illustrating a basic frequency stabilization system for a frequency modulated oscillation generator constructed in accordance with the principles of the invention.
Figure 4:
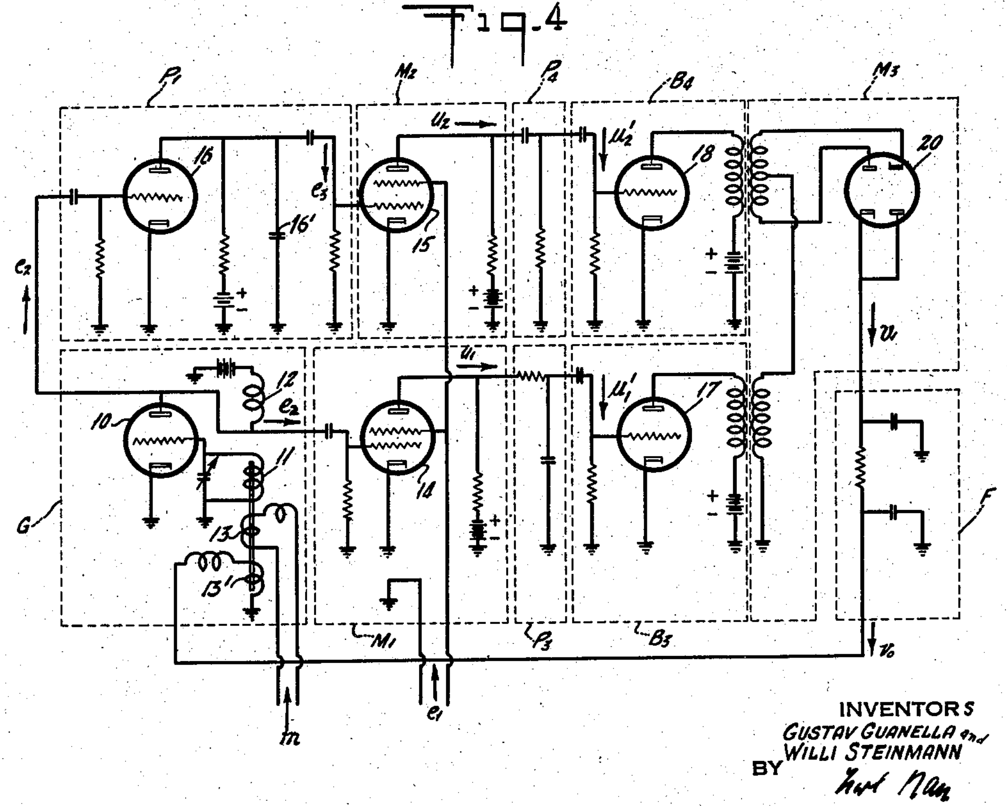
Figure 4 is a more detailed circuit diagram of a frequency modulated oscillation generator system with automatic center frequency stabilization of the type shown in Figure 1. Like reference characters identify like parts in the different views of the drawings.

Referring more particularly to Figure 1, the center or mean frequency of the high frequency output voltage $e_2$ of the generator G having its frequency modulated in accordance with a modulating voltage $m$ is to be stabilized or controlled so as to coincide as closely as possible with the frequency $f_1$ of a controlling voltage $e_1$ supplied from a suitable constant frequency source which may be a piezo-electric oscillator or the like. For this purpose, the generator voltage $e_2$ serves to excite a pair of modulating devices $M_1$ and $M_2$ of any known design, such as dry rectifier modulators or electronic modulators as shown in Figure 4 described later. The control of the modulator $M_1$ by the generator voltage $e_2$ is effected directly, while the modulator $M_2$ is preceded by a phase shifting device $P_1$ designed to produce a 90° phase rotation of its output voltage $e_3$ with respect to the generator voltage $e_2$. Such a phase shifting device may consist of a network of resistors and condensers or inductance coils, in a manner well known. Alternatively, a pair of phase shifting devices may be employed in place of a single phase shifter $P_1$, each being inserted in one of the connecting leads between the generator G or the constant frequency source on the one hand and the modulators $M_1$ and $M_2$, on the other hand. In the latter case, the two phase shifting devices are so designed that one causes a phase rotation in one direction and the other causes a phase rotation in the other direction in such a manner as to result in a final relative phase of 90° between the modulator input voltages $e_2$ and $e_3$, respectively.

The modulators $M_1$ and $M_2$ are furthermore excited by the controlling voltage $e_1$ having a frequency $f_1$ upon which the generator G is to be stabilized. As pointed out, the frequency $f_1$ may be derived from a crystal controlled oscillator or any other frequency stabilized high frequency source. Alternatively, the frequency $f_1$ may vary in accordance with any schedule such as a signal frequency wave, i. e., it may be a second frequency modulated generator similar to the generator G.

As a result of the mutual intermodulation of the voltages $e_1$ and $e_2$ on the one hand and $e_1$ and $e_3$ on the other hand in the modulators $M_1$ and $M_2$, respectively, output voltages $u_1$ and $u_2$ are obtained including components having a frequency equal to the difference frequency $f_1-f_2$ of the modulating voltages $e_1$ and $e_2$. In the case of Figure 1, these voltage components may be expressed mathematically as shown in the following, wherein small letters represent instantaneous values and large letters designate the amplitudes of the respective voltages.

The controlling or comparison high frequency voltage $e_1$ having a frequency $f_1$ is represented by the following equation:

(1) $$e_1=E_1 \sin w_1t$$

wherein $w=2\pi f_1$ in a manner well understood.

The generator G is assumed to have its frequency modulated in accordance with a low frequency or modulating voltage $m=M \sin w_mt$, wherein $w_m=2\pi f_m$ with $f_m$ representing the $f_m$ modulating frequency. In place of a single frequency component $f_m$, the modulating wave may be a complex character such as a sound wave comprising a fundamental frequency and a plurality of harmonics, as will be readily understood.

Accordingly, the modulated output voltage of the generator G is expressed by the following equation:

(2) $$e_2=E_2 \sin (w_2t+d \cos w_mt)$$

wherein $w_2=2\pi f_2$ represents the angular velocity of the generator frequency and $d$ is the modulation index which in known manner is proportional to the frequency deviation.

By rotating the phase of the frequency modulated voltage $e_2$ by 90° by means of the phase shifter $P_1$ there is obtained the input voltage $e_3$ of the modulator $M_2$ according to the following expression:

(3) $$e_3=E_2 \cos (w_2t+d \cos w_mt)$$

The output voltage $u_1$ of the modulator $M_1$ as a result of the intermodulation of voltages $e_1$ and $e_2$ is then expressed as follows:

(4) $$u_1=k_1e_1e_2\cong K_1 \cos [(w_2-w_1)t+d \cos w_mt]+ \text{terms of higher frequency}$$

For the purpose of regulation, only the difference frequency components $w_2-w_1$ are utilized and selected by suitable filters in a manner well understood. The constant $k_1$ depends upon the design of the modulator circuits and the constant $K_1$ furthermore depends upon the amplitudes of the modulator input voltages.

Similarly, in the modulator $M_2$ there is produced the output voltage $u_2$ by intermodulation of voltages $e_1$ and $e_3$ in accordance with the following equation:

(5) $$u_2=k_2e_1e_3\cong K_2 \sin [(w_2-w_1)t+d \cos w_mt]+ \text{terms of higher frequency}$$

Accordingly, the difference frequency voltages $u_1$ and $u_2$ have a relative phase displacement of 90° with respect to each other. These voltages may be utilized in a known manner in a cathode ray tube or an electro-mechanical rotary field device such as a Ferraris motor, to produce a rotary electric or magnetic field revolving at a speed proportional to the difference frequency in either a forward or backward direction, depending upon whether one of the input frequencies $f_1$ and $f_2$ deviates in either sense from the other frequency. In the following, voltages of this character being relatively displaced by 90° will be referred to as rotary field voltages in analogy to a rotary field device as mentioned above.

One of these rotary field voltages, viz. voltage $u_1$ in the example shown, is passed through a further phase-shifting or differentiating device $P_2$ comprising a series capacity and a parallel resistance, whereby a new voltage $u_3$ is obtained having its phase rotated by at least approximately 90° with respect to the voltage $u_1$.

The voltage $u_3$ at the output of the phase-shifting device $u_2$ is expressed by the following equation:

(6) $$u_3=k_3\frac{du_1}{dt}=K_3 \sin [(w_2-w_1)t+d \cos w_mt]\cdot[(w_2-w_1)-dw_m \sin w_mt]$$

Since, in accordance with the foregoing, the voltages $u_1$ and $u_2$ also include a 90° phase angle with each other, it follows that voltages $u_2$ and $u_3$ are either in-phase or anti-phase with each other, depending upon the relative sense of deviation of the input frequencies $f_1$ and $f_2$.

Voltages $u_2$ and $u_3$ are applied to a third or final modulator $M_3$, these voltages as pointed out being either in phase or of opposite phase, depending upon the sense of rotation of an imaginary rotary field of the voltages are applied to a suitable rotary field device. In other words, the voltages $u_2$ and $u_3$ which are of the same frequency equal to the difference between the generator frequency $f_2$ and the controlling frequency $f_1$ will be either in phase or in phase opposition depending upon whether the generator frequency changes below or above the controlling frequency as will be readily understood.

The modulator $M_3$ produces an output voltage $v_1$ as a result of the intermodulation of the voltages $u_2$ and $u_3$ as represented by the following equation:

(7) $$v_1=k_4u_2u_3=K_4[(w_2-w_1)-dw_m \sin w_mt]\cdot[1-\cos^2\{(w_2-w_1)t+d \cos w_mt\}]$$

As is seen from Equation 7, voltage $v_1$ includes a direct current component as follows:

$$v_0=K_4(w_2-w_1)$$

This direct current component which varies both in sense and magnitude in proportion to the frequency difference between $w_1$ and $w_2$ is utilized for influencing the frequency of the generator G to be stabilized. For this purpose, voltage $v_1$ is passed through a smoothing device in the form of a low-pass filter F serving to suppress the alternating current components of $v_1$ which are undesirable for the frequency control.

As is understood, the connection and polarity of the controlling voltage $v_0$ in relation to the frequency controlling element of the generator G should be such as to counteract an initial deviation of the generator frequency $f_2$ from its assigned frequency equal to the controlling frequency $f_1$.

Referring to Figure 4, there is shown a more detailed circuit diagram of a center frequency stabilized frequency modulated generator system corresponding to the principal arrangement according to Figure 1. The generator G is shown in the form of a standard regenerative oscillator comprising an electronic tube 10, a grid tank circuit comprising the tank circuit inductance 11 and an anode feedback or tickler coil 12. The generator frequency $f_2$ is controlled by varying the tank circuit inductance 11 by means of a pair of auxiliary pre-magnetization windings arranged upon a common weakly saturated iron core of said inductance, in a manner well understood. Control winding 13 is connected to a suitable source of modulating potential, such as the output of a microphone circuit for modulating the oscillation frequency in accordance with a modulating signal wave $m$. The phase shifting circuit $P_1$ comprises an amplifier tube 16, the plate of which is loaded by a relatively large capacity 16' in such a manner as to cause the output voltage $e_3$ to be approximately 90° phase shifted or in quadrature with the input voltage $e_2$.

The modulators $M_1$ and $M_2$ are shown in the form of multigrid electronic tubes 14 and 15, such as pentodes or pentagrid converters or the like of known construction. The generator voltages $e_2$ and $e_3$ having a frequency $f_2$ are applied each to one of the control grids of the tubes 14 and 15, while the control voltage $e_1$ of frequency $f_1$ is applied to both the remaining control grids of said tubes. As is understood, the tubes may be provided with additional auxiliary grids such as a screen grid interposed between the control grids in accordance with standard practice. In Figure 4, two phase-shifting networks $P_3$ and $P_4$ are provided for rotating the phases of the modulator output voltages $u_1$ and $u_2$, network $P_3$ consisting of a series resistance and a parallel capacity and network $P_4$ consisting of a series capacity and a parallel resistance. Accordingly, one of the phase-shifting circuits acts to produce a phase rotation in one direction and the other acts to produce a phase rotation in the opposite direction, the design of the circuits being such as to result in a total relative phase displacement of 90° between the output voltages $u_1'$ and $u_2'$.

Voltages $u_1'$ and $u_2'$ are each applied to an amplitude limiter $B_3$ and $B_4$, respectively, consisting in the example shown of limiting tubes 17 and 18 and serving to effect a limitation or equalization of the amplitudes of both voltages $u_1'$ and $u_2'$. The latter are in turn applied to the final modulator $M_3$ in the same manner as shown in Figure 1. As a result of the amplitude limitation, the regulating voltage $v_0$ obtained from the output of the modulator $M_3$ will be retricted to a predetermined limit or range. The final modulator $M_3$ in the example shown has the form of a double diode 20 connected to a double wave rectifier circuit. Such a modulator functions in a well known manner by rectifying the sum and difference of the input voltages $u_1'$ and $u_2'$ and by differentially combining the rectified voltages into a single output voltage $v_1$. If the frequency $f_2$ of the generator G is equal to the controlling frequency $f_1$, the difference frequencies $u_1'$ and $u_2'$ will disappear entirely, whereas with a relative departure between the generator and controlling frequencies a direct current regulating voltage $v_0$ will appear in the output of the modulator $M_3$ after smoothing by the filter F, said regulating voltage varying both in sense and in magnitude in dependence upon said frequency departure.

In the example shown, filter F is a low-pass filter comprising a series resistance and a pair of parallel or by-pass condensers designed to eliminate the undesirable alternating current components contained in the modulator output voltage $v_1$. The filtered regulating voltage $v_0$ is applied to the generator control winding 13' in such a sense as to effect a generator frequency variation counteracting and substantially balancing an initial deviation from the assigned value, whereby to stabilize the generator center frequency in a manner understood from the foregoing.

According to the invention, at least one of the oscillation voltages $e_1$ and $e_2$ has been assumed to be frequency modulated in accordance with an audio signal voltage or any other information to be transmitted. Thus, the generator G may be a frequency modulated master oscillator forming part of an FM communication system for the transmission of voice or sound signals. Due to the frequency modulation of the generated frequency, the frequency difference between the voltages $e_1$ and $e_2$ varies rapidly at the rate of the speech or other modulating signal, or in other words the imaginary rotary field voltages $u_1$ and $u_2$ will produce a resultant field oscillating or rotating alternately in opposite directions. Accordingly, the control voltage $v_1$ also alternates or changes its direction in the rhythm of the modulating signal $m$. This voltage includes a direct current component $v_0$ which changes its direction in accordance with the mean or center frequency deviation between the generator and controlling voltages $e_1$ and $e_2$. Voltage $v_0$ is extracted from the voltage $v_1$ by way of the filter F and serves to regulate or displace the mean or center carrier frequency of the generator G. The mean value of $v_0$ therefore corresponds, both as to sense and magnitude, to the mean frequency difference between $f_1$ and $f_2$ and is utilized to correct the frequency of the transmitter in such a sense as to counteract and substantially balance the center frequency deviation from the assigned value.

The filtering of the regulating voltage $v_1$ constitutes an essential element of the invention, inasmuch as it serves to suppress the alternating components of the regulating voltage originating from the frequency modulation of the generator frequency. If this filter is omitted, voltage $v_1$ including one or all of the modulating signal components will produce a negative feedback upon or reduction of the degree of frequency modulation of the transmitter.

The control of the generator frequency may be effected in any other manner known in the art such as by means of an electronic reactance tube having its grid bias controlled by the regulating voltage $v_0$. According to another modification, the regulating voltage $v_0$ is utilized to energize an electro-mechanical system having a member moving in response to the sense of the applied voltage and serving to operate a variable condenser connected in the oscillator tank circuit and correcting the oscillating frequency. Such a mechanical system may comprise a rotary magnet coil mounted within a permanent magnetic field in the form of a standard galvanometer or a direct current motor whose sense of rotation depends upon the sense of the regulating voltage.

It is furthermore possible to effect a differential frequency control by actuating two or more frequency correcting devices by the regulating voltage $v_0$. Such a combined regulation is obtained for instance by using a mechanical correcting device having a high time constant and serving to correct relatively slow and large generator deviations from the assigned frequency, and by additionally providing a purely electric correcting system such as a reactance tube for compensating relatively rapid and slight center frequency deviations of the generator.

A further combined regulation may be effected by using a first regulating system having a high time constant and relatively short attack time and a further regulating device having a relatively small time constant and long response or attack period, both said regulating systems controlling the generator frequency in dependence upon the regulating voltage $v_0$.

As pointed out above, the invention may be utilized for the stabilization of the center or carrier frequency of a frequency modulated transmitter, in which case it is possible to obtain accuracies of $10^{-6}$ for short waves and an actual stabilization of the frequency within plus or minus 200 cycles.

According to a further feature of the invention, the accuracy of the frequency control may be further increased by comparing the voltages $u_1$ and $u_2$ with the aid of an additional auxiliary and constant frequency, in place of the direct comparison as shown in Figure 1. According to this modification, a further auxiliary oscillation voltage is produced which is either in phase or in phase opposition to said first auxiliary voltage depending upon whether frequency $f_2$ deviates in one or the other direction from the controlling frequency $f_1$. By an intermodulation of both said auxiliary frequency voltages there is obtained a final regulating voltage $v_0$ including positive or negative direct current components in a manner similar as described hereinabove.

Figure 2:
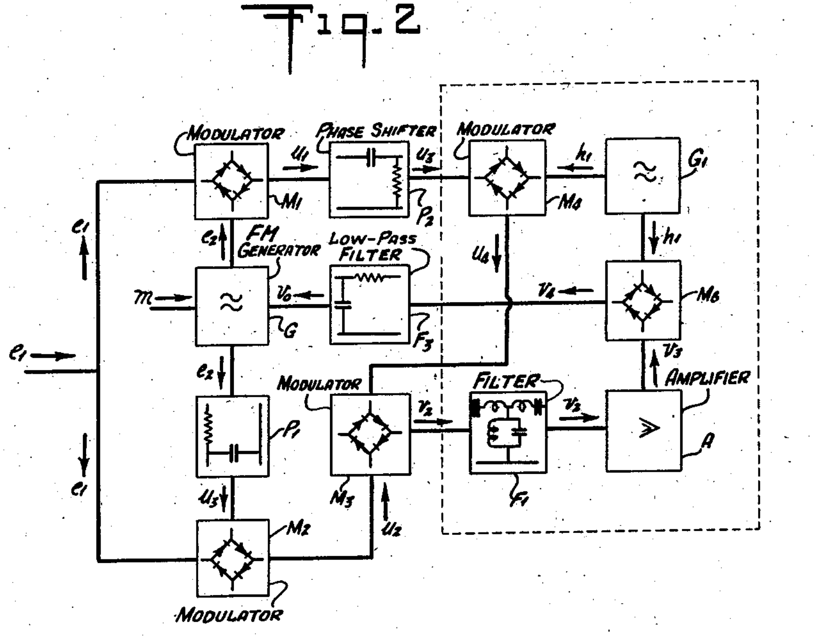
Figures 2 and 3 are further block diagrams illustrating modifications of the system shown in Figure 1.

An improved frequency stabilization system of this type is illustrated in Figure 2. The newly added parts are contained within the dotted rectangle, the remaining parts being substantially similar to those of Figure 1. In this arrangement, the output voltage $u_1$ of the modulator $M_1$ is applied by way of the phase shifting device $P_2$ to an auxiliary modulator $M_4$. The latter is furthermore excited by a voltage of auxiliary frequency $h_1$ supplied by an oscillator or generator $G_1$. The output voltage $u_4$ of the modulator $M_4$ resulting from the intermodulation of voltages $u_3$ and $h_1$ is in turn applied to the modulator $M_3$ which is furthermore excited by the voltage $u_2$.

Accordingly, the output voltage $v_2$ of the modulator $M_3$ resulting from the intermodulation of the voltages $u_2$ and $u_4$ will have a frequency $h_1$ equal to the frequency of the auxiliary generator $G_1$ and a phase which will be equal to or opposite to the phase of the generator $G_1$ depending upon the sense of relative departure between the frequencies $f_1$ and $f_2$, respectively. The output voltage $v^2$ is in turn applied by way of a filter $F_1$ and an amplifier A to the modulator $M_6$ which is furthermore excited by the auxiliary voltage supplied by the generator $G_1$. Accordingly, the output voltage $v_4$ of the modulator $M_6$ being the result of intermodulation of voltages $h_1$ and $v_3$, in case of a frequency deviation between frequencies $f_1$ and $f_2$, will include a direct current component in addition to difference or combination frequency components, the sense of said direct current component depending upon the sense of the deviation between the frequencies $f_1$ and $f_2$.

The output voltage $v_4$ is passed through the low-pass filter $F_3$ acting as a smoothing element to product a final regulating voltage $v_0$ free from alternating current components or harmonics and suitable for correcting the frequency of the generator G in substantially the same manner as described hereinbefore. In other words, the voltage $v_0$ influences a frequency controlling element of the generator in such a sense that in case of a frequency deviation from the assigned value, the controlling effect of the regulating voltage will result in a reduction of said deviation so as to substantially balance any initial deviation of the average or center frequency of the generator G from the assigned value.

If the frequency of the auxiliary generator $G_1$ is chosen to have a relatively high value and if the modulator $M_6$ is of the type comprising rectifiers having operating characteristics with a sharp bend, it is possible to have the modulator $M_6$ operate in the manner of a periodic switch for the voltage $v_3$.

Figure 3:
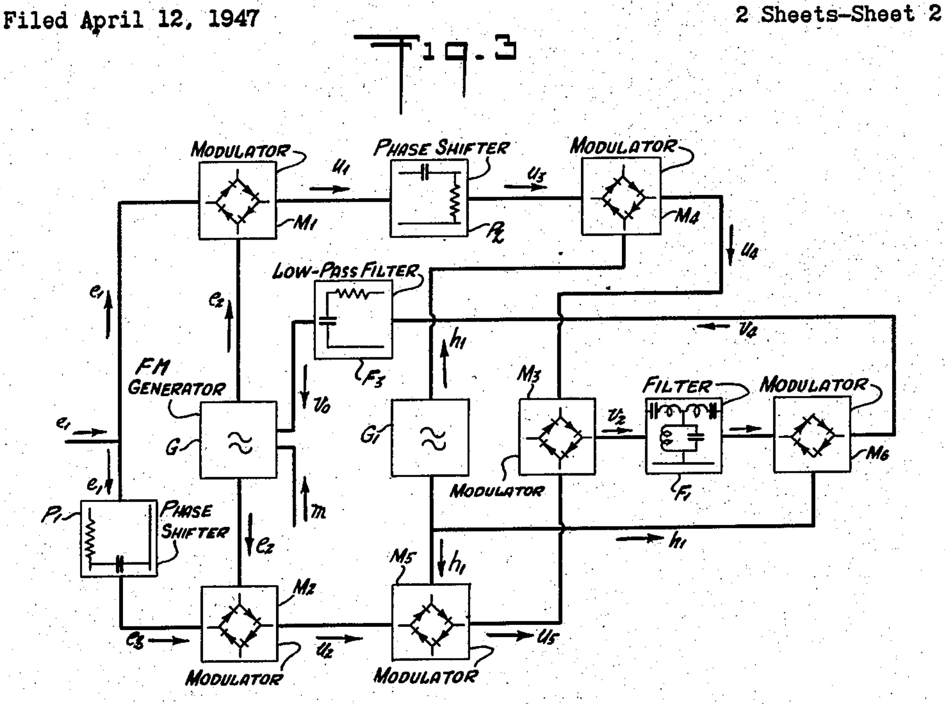

A somewhat modified arrangement of this type is shown in Figure 3, wherein the auxiliary frequency $h_1$ operates upon both the rotary field components $u_3$ and $u_2$ through a pair of modulators $M_4$ and $M_5$, as compared with Figure 2 where the auxiliary frequency $h_1$ operates on one of the rotary field components only. Furthermore, in this modification, the phase shifting device $P_1$ has been inserted in the lead to the modulator $M_2$ from the source of the controlling voltage $e_1$.

In place of the modulator $M_6$ and the smoothing filter $F_3$, a watt meter type instrument may be used having a movable element which directly mechanically controls a tuning condenser of the generator G, as is readily understood.

As pointed out, the arrangement for automatic frequency control or stabilization according to the invention may be employed in connection with a frequency modulated transmitter for maintaining the mean or center frequency at an assigned value as determined by a piezo-electric oscillator or an equivalent constant frequency oscillation source.

Moreover, the arrangement according to the invention may be employed in connection with a frequency modulated receiver for effecting an automatic tuning control, in which case the operation, in a known manner, is such as to control the tuning of the auxiliary heterodyne oscillator of the mixer stage in such a manner as to maintain an exact tuning adjustment of the receiver with the mean or center frequency of a received frequency modulated carrier signal.

A further application of the invention consists in the tuning of the oscillator to a component of a complex controlling oscillation wave containing a fundamental and a plurality of harmonic frequencies. In this modification, it is necessary that at least one of the rotary field voltages $u_1$ and $u_2$ is passed through a band-pass filter having a band width which is equal or less than one half the fundamental frequency of the comparison or the controlling wave, i. e., less than one half the frequency difference between two adjacent harmonics thereof. In the case of equality between the generator voltage $e_2$ and a harmonic of the controlling voltage $e_1$, there is obtained in this case a regulating voltage including a direct current component and additional alternating component voltages separated by distances equal to the fundamental frequency. In the most unfavorable case, where the frequency $f_2$ of $e_2$ is exactly in the middle between two frequency components or harmonics of voltage $e_1$, the lowest frequency components of the difference frequency or rotary field voltages $u_1$ and $u_2$ will be equal to one half the fundamental frequency. In order that the filtered rotary field voltages $u_1$ and $u_2$ contain only a single component, it is necessary therefore that the width of the mentioned additional band-pass filter should be equal or less than half the fundamental frequency. In this case, the frequency control is effected in such a manner that the frequency $f_2$ is at first brought to coincidence with a harmonic frequency of the oscillation $e_1$ which is closest to it. It is advisable to use equal band-pass filters for both the voltages $u_1$ and $u_2$ in which case any additional phase rotation will be the same for both voltages, thus eliminating any influence upon the regulation process.

It may be advantageous to limit the amplitude of at least one of the rotary field voltages to a constant value in order to maintain the transmission factor of the passing frequency within a desired range. The amplitude limitation may be effected in a known manner by means of rectifiers, or other limiting devices or circuits. In place of the amplitude limitation, a rapidly acting automatic volume control may be employed. This amplitude limitation and the phase shifting elements may be so designed as to obtain a maximum regulating voltage for a relatively small center frequency deviation compared with the frequency variations caused by the frequency modulation. In other words, the magnitude of the regulating voltage should not vary appreciably if the mean frequency deviation changes to values beyond the deviation due to frequency modulation in accordance with the modulating signal.

A further possibility for controlling the regulating process consists in a limitation of the amplitude of the frequency regulating or correcting voltage. In this manner, a steep or relatively rapidly acting frequency control is obtained in case of relatively small frequency deviations between the generator and controlling frequencies, which control changes into a more flat operation as the frequency deviation increases. The limitation of the regulating voltage is essential for the operation of the system. Accordingly, the limiters 17 and 18 shown in Figure 4 constitute an essential part of the invention. These limiters serve to restrict the amplitudes of the voltages $u_3$ and $u_4$ which are proportional to the frequency to a maximum limit value. Accordingly, they serve to maintain the correcting voltage $v_1$ constant from a definite frequency difference $f_1—f_2$ on upward. The resistances and condensers of the phase shifting networks $P_3$ and $P_4$ are advantageously so designed that the regulating voltage $v_1$ attains a maximum at a frequency difference $f_1—f_2$ of about 200 cycles. For greater frequency deviations, i. e., frequency deviations approaching or equal to the components of the modulating signal, the control arrangement will therefore be inoperative, thus preventing any negative feedback effect or reduction of the degree of frequency modulation. Accordingly, the center or carrier frequency of the frequency modulated transmitter may be efficiently stabilized in accordance with a constant control frequency, substantially independently of the instantaneous condition of modulation of the transmitter.

In the foregoing it was assumed that one of the high frequency oscillations $e_1$ and $e_2$ is frequency modulated, while the other oscillation represented a constant control frequency. According to a modification, the invention may also be utilized in such cases where both oscillations are frequency modulated in accordance with the same or different modulated signals. In this case, both transmitters may be synchronized for operation upon the same carrier frequency for special purposes and applications.

As will be understood from the foregoing, one of the basic features of the invention is the design of the phase-shifting or differentiating circuit or network $P_2$. The latter may consist of a series condenser C and parallel resistance R in a manner well known and indicated in the drawings. If, in a circuit of this type, the value of the resistance and capacity are so chosen as to give a high ratio of capacitative reactance to resistance and a low ratio of time constant (RC) to the reciprocal of the frequency of operation $$\left(\frac{1}{f}\right)$$

the voltage across the resistance will be proportional to the differential quotient of the input voltage variations impressed upon both the capacity and resistance in series. Thus, in the present case, if the generated frequency $f_2$ is to be maintained with $\pm 1{,}000$ cycles of the controlling frequency $f_1$, the lowest frequency of the filter input voltage $u_1$ will be $f_1-f_2=1{,}000$ cycles and the filter or differentiator $P_2$ should be so designed as to fulfill the above condition for this frequency. This condition is then maintained for all higher frequencies or greater frequency deviations beyond the assigned limit of $\pm 1{,}000$ cycles from the assigned or controlling frequency.

While there have been shown and described a few desirable embodiments of the invention, it is understood that this disclosure is for the purpose of illustration and that obvious changes in the design, proportion and arrangement of parts, as well as the substitution of equivalent elements and steps for those herein shown and described, may be made without departing from the spirit and scope of the invention as set forth in the appended claims. The specification and drawings are accordingly to be regarded in an illustrative rather than in a limiting sense.

We claim:

1. In a frequency stabilization system, an oscillation generator subject to variations of the generated frequency, a source having a substantially constant controlling frequency, means for maintaining the generated frequency within a predetermined range of deviation from said controlling frequency comprising a pair of first modulating devices each having a pair of input circuits and an output circuit, circuit connections from said generator to one of the input circuits of each of said devices, further circuit connections from said source to both the remaining input circuits of said devices, phase shifting means inserted in at least one of said circuit connections, to produce a pair of auxiliary energies in the output circuits of said devices having a mutual substantially 90° phase relation and a frequency equal to the difference between the generated and controlling frequencies, a third modulating device having a pair of input circuits and an output circuit, means for applying each of said auxiliary energies to a separate input circuit of said third modulating device, further phase shifting means connected between at least one of said first modulating devices and said third modulating device, to effect a substantially 90° relative phase shift of said auxiliary energies, and electrically responsive frequency control means for said generator having a control circuit connected to the output of said third modulating device.

2. In a frequency stabilization system, a self-excited oscillation generator having a tuned circuit determative of the generated frequency, a source having a substantially constant controlling frequency, means for maintaining the generated frequency within a predetermined range of deviation from said controlling frequency comprising a pair of first modulating devices each having a pair of input circuits and an output circuit, circuit connections from said generator to one input circuit of each of said devices, further circuit connections from said source to both the remaining input circuits of said devices, phase shifting means inserted in at least one of said circuit connections, to produce a pair of auxiliary energies in the output circuits of said devices having a mutually substantially 90° phase relation and a frequency equal to the difference between the generated and controlling frequencies, a third modulating device having a pair of input circuits and an output circuit, means for applying each of said auxiliary energies to a separate input circuit of said third modulating device, further phase shifting means connected between at least one of said first modulating devices and said third modulating device, to effect a substantially 90° relative phase shift of said auxiliary energies, a tuning reactance for said generator having a direct current control circuit for controlling the generated frequency, further means for deriving direct current control energy from the output of said third modulating device, and means for applying said control energy to said control circuit, to effect a generator frequency variation in response to and counteracting an initial deviation thereof from said controlling frequency.

3. In a frequency stabilization system, an oscillation generator subject to variations of the generated frequency, a source having a substantially constant controlling frequency, means for maintaining the generated frequency within a predetermined range of deviation from said controlling frequency comprising a pair of first modulating devices each having a pair of input circuits and an output circuit, circuit connections from said generator to one of the input circuits of each of said devices, further circuit connections from said source to both the remaining input circuits of said devices, phase shifting means inserted in at least one of said circuit connections, to produce a pair of auxiliary energies in the output circuits of said devices having a mutual substantially 90° phase relation and a frequency equal to the difference between the generated and controlling frequencies, a third modulating device having a pair of input circuits and an output circuit, means for applying each of said auxiliary energies to a separate input circuit of said third modulating device, further phase shifting means connected between at least one of said first modulating devices and said third modulating device, to effect a substantially 90° relative phase shift of said auxiliary energies, electrically responsive frequency control means for said generator having a control circuit connected to the output of said third modulating device, and amplitude limiting means connected between each of the output circuits of said first modulating devices and said third modulating device.

4. In a frequency stabilization system, a self-excited oscillation generator including a resonant tank circuit having a tuning frequency determative of the generated frequency, a source having a substantially constant controlling frequency, means for maintaining the generated frequency within a predetermined range of deviation from said controlling frequency comprising a pair of first mixing devices each having a pair of input circuits and an output circuit, circuit connections from said generator to one of the input circuits of each of said devices, further circuit connections from said source to both the remaining input circuits of said devices, phase shifting means inserted in at least one of said circuit connections, to produce a pair of quadrature energies in the output circuits of said devices having a frequency equal to the difference between the generated and controlling frequencies, a third mixing device having a pair of input circuits and an output circuit, means for applying each of said quadrature energies to a separate input circuit of said third mixing device, further phase shifting means connected between at least one of said first mixing devices and said third mixing device and adapted to effect a substantially 90° relative phase shift of said quadrature energies, a reactance forming an effective tuning element of said tank circuit and having direct current control circuit for electrically varying the generated frequency, a low-pass filter connected to the output of said third mixing device to produce direct current control energy of sense and magnitude varying in accordance with the deviation of the generated frequency from said controlling frequency, and means for applying said direct current energy to said control circuit, to effect a generator frequency variation in response to and counteracting an initial deviation thereof from said controlling frequency.

5. In a center frequency stabilization system for an oscillation generator having a frequency modulated in respect to a center frequency in accordance with a modulating signal wave, a source having a substantially constant controlling frequency, means for maintaining said center frequency within a predetermined range of deviation from said controlling frequency comprising a pair of first mixers each having a pair of input circuits and an output circuit, circuit connections from said generator to one of the input circuits of each of said mixers, further circuit connections from said source to both the remaining input circuits of said mixers, phase shifting means inserted in at least one of said circuit connections, to produce a pair of auxiliary energies in the output circuits of said mixers having a mutual substantially 90° phase relation and a frequency equal to the difference between the generated and controlling frequencies, a third mixer having a pair of input circuits and an output circuit, means for applying each of said auxiliary energies to a separate input circuit of said third mixer, further phase shifting means interposed between at least one of said first mixers and said third mixer and adapted to effect a substantially 90° relative phase shift of said auxiliary energies, and electrically responsive frequency control means for said generator having a control circuit connected to the output of said third mixer, to vary said center frequency in response to and counteracting an initial deviation thereof from said controlling frequency.

6. In a center frequency stabilization system for a frequency modulated oscillation generator having a tuning reactance controlled in accordance with a modulating signal wave, a source having a substantially constant controlling frequency, means for maintaining said center frequency within a predetermined range of deviation from said controlling frequency comprising a pair of first mixers each having a pair of input circuits and an output circuit, circuit connections from said generator to one of the input circuits of each of said mixers, further circuit connections from said source to both the remaining input circuits of said mixers, phase shifting means inserted in at least one of said circuit connections, to produce a pair of auxiliary energies in the output circuit of said mixers having a mutual substantially 90° phase relation and a frequency equal to the difference between the generated and controlling frequencies, a third mixer having a pair of input circuits and an output circuit, means for applying each of said auxiliary energies to a separate input circuit of said third mixer, further phase shifting means interposed between at least one of said first mixers and said third mixer and adapted to effect a substantially 90° relative phase shift of said auxiliary energies, a direct current control circuit for said reactance, low-pass filter means connected to the output circuit of said third mixer for deriving direct current control energy, means for applying said control energy to said control circuit to effect a generator frequency variation in response to and counteracting an initial deviation thereof from said controlling frequency, and amplitude limiting means interposed between each of the output circuits of said first mixers and said third mixer to limit the amplitude of said control energy to a predetermined value.

7. In a center frequency stabilization system for an oscillation generator having its frequency modulated in accordance with a modulating signal wave, a source having a substantially constant controlling frequency, means for maintaining said center frequency within a predetermined range of deviation from said controlling frequency comprising a pair of first mixers each having a pair of input circuits and an output circuit, circuit connections from said generator to one of the input circuits of each of said mixers, further circuit connections from said source to both the remaining input circuits of said mixers, phase shifting means inserted in at least one of said circuit connections, to produce a pair of auxiliary energies in the output circuits of said mixers having a mutual substantially 90° phase relation and a frequency equal to the difference between the generated and controlling frequencies, a third mixer having a pair of input circuits and an output circuit, means for applying each of said auxiliary energies to a separate input circuit of said third mixer, further phase shifting means interposed between at least one of said first mixers and said third mixer and adapted to effect a substantially 90° relative phase shift of said auxiliary energies, a tuning reactance for said generator having a direct current control circuit for controlling the generated frequency, low-pass filter means connected to the output circuit of said third mixer for deriving direct current control energy, further means for applying said control energy to said control circuit to effect a generator frequency variation in response to and counteracting an initial deviation thereof from said controlling frequency, and substantially identical amplitude limiting means interposed between each of the input circuits of said third mixer and said first mixers, to limit the amplitude of said control energy to a predetermined value.

8. In a frequency stabilization system, an oscillation generator subject to variations of the generated frequency, a source having a substantially constant controlling frequency, means for maintaining the generated frequency within a predetermined range of deviation from said controlling frequency comprising a pair of first mixers each having a pair of input circuits and an output circuit, circuit connections from said generator to an input circuit of each of said mixers, further circuit connections from said source to both the remaining input circuits of said mixers, phase shifting means inserted in at least one of said circuit connections, to produce a pair of auxiliary energies in the output circuits of said mixers having a mutual substantially 90° phase relation and a frequency equal to the difference between generated and controlling frequencies, further phase shifting means connected to at least one of said output circuits for effecting a substantially 90° relative phase rotation of said auxiliary energies, a second source having a substantially constant frequency, a third mixer having a pair of input circuits with means for exciting the same by said second source and to at least one of said auxiliary energies, a fourth mixer having its input circuit energized by the other of said auxiliary energies and by the output of said third mixer, respectively, a fifth mixer having a pair of input circuits excited by said second source and by the output of said fourth mixer, respectively, and electrically responsive frequency control means for said generator having a control circuit connected to the output of said fifth mixer, to vary the generated frequency in response to and counteracting an initial deviation thereof from said controlling frequency.

9. In a center frequency stabilization system for an oscillation generator having its frequency modulated in accordance with a modulating signal wave, a source having a substantially constant controlling frequency, means for maintaining the center frequency of said generator within a predetermined range of deviation from said controlling frequency, comprising a pair of first mixers each having a pair of input circuits and an output circuit, circuit connections from said generator to one of the input circuits of each of said mixers, further circuit connections from said source to both the remaining input circuits of said mixers, phase shifting means inserted in at least one of said circuit connections, to produce a pair of quadrature energies in the output circuits of said mixers having a frequency equal to the difference between the generated and controlling frequencies, further phase shifting means connected to at least one of said input circuits for effecting a substantially 90° phase relative rotation of said quadrature energies, a second source having a substantially constant frequency, means for intermodulating at least one of said quadrature energies with energy from said second source, to produce auxiliary energy at the frequency of said second source and being in phase and phase opposition, respectively, to said second source in dependence upon the sense of deviation of the generated frequency from said controlling frequency, means for intermodulating said auxiliary energy with energy directly derived from said second source to produce direct current controlling energy, electrically responsive frequency control means for said generator energized by said control energy, to vary the generated frequency in response to and counteracting an initial deviation thereof from said controlling frequency.

10. In a frequency stabilization system, an oscillation generator subject to variations of the generated frequency, a source of substantially constant controlling frequency, means for maintaining the generated frequency within a predetermined range of deviation from said controlling frequency comprising a pair of mixers, means including phase shifting means inserted in at least one input circuit of one of said mixers for exciting each of said mixers by energies derived from both said generator and said source to produce a pair of quadrature difference frequency energies by said mixers, means for relatively shifting the phases of said difference frequency energies by substantially 90°, a third mixer, means for exciting said third mixer by the resulting difference frequency energies, and electrically responsive frequency control means for said generator having a direct current control circuit connected to the output of said third mixer.

11. In a center frequency stabilization system for an oscillation generator having its frequency modulated in accordance with a modulating signal wave, a source of substantially constant controlling frequency, means for maintaining said center frequency within a predetermined range of deviation from said controlling frequency, comprising a pair of first mixers, means including phase shifting means inserted in at least one input circuit of one of said mixers for exciting each of said mixers by energies derived from both said generator and said source to produce a pair of quadrature difference frequency energies, means for relatively shifting the phases of said difference frequency energies by substantially 90°, a third mixer, means for applying the resulting difference frequency energies to the input of said third mixer, and electrically responsive frequency control means for said generator having a direct current control circuit connected to the output of said third mixer, to vary the generated center frequency in response to and counteracting an initial deviation thereof from said controlling frequency.

12. In a center frequency stabilization system for an oscillation generator having its frequency modulated in accordance with a modulating signal, a first source having a substantially constant controlling frequency, means for maintaining the center frequency of said generator within a predetermined range of deviation from said controlling frequency comprising a pair of first mixers each having a pair of input circuits and an output circuit, circuit connections from said generator to one of the input circuits of each of said mixers, further circuit connections from said source to both the remaining input circuits of said mixers, phase shifting means inserted in at least one of said circuit connections for effecting a relative quadrature phase shift between the input energies applied to one of said mixers with respect to the input energies of the other mixer to thereby produce a pair of quadrature energies in the output circuits of said mixers having a frequency equal to the difference between the generated and controlling frequencies, further phase shifting means for effecting a relative substantially 90° phase rotation between said quadrature energies, a second source of substantially constant frequency, a pair of second mixers for combining each of the relatively phase shifted quadrature energies with energy of said second source, a third mixer for combining the output energies of said second mixers, and filter means connected thereto for deriving auxiliary output energy at the frequency of said second source and being in phase and phase opposition, respectively, to the source frequency depending upon the sense of deviation of the generated frequency from the controlling frequency, further means for combining said auxiliary energy with energy of said second source to produce direct current control energy, and electrically responsive frequency control means for said generator energized by said direct current energy to vary the frequency of said generator in response and in counteracting relation to a deviation thereof from said controlling frequency.

13. In a frequency stabilization system, an oscillation generator subject to variation of the generated frequency, a source having a substantially constant controlling frequency, means for maintaining the generated frequency within a predetermined range of deviation from said controlling frequency comprising means for mutually intermodulating each of a pair of separate energy components derived from said generator with energy components derived from said source to produce a pair of combination difference frequency energies; means for shifting the phase of at least one of said energy components to effect a substantially quadrature phase relation of said difference frequency energies, further means for producing a substantially 90° relative phase shift of said difference frequency energies, means for mutually intermodulating the resultant difference frequency energies to produce direct current control energy varying in sense and magnitude in response to an initial relative frequency departure between the generated and controlling frequencies in respect to a normal frequency difference therebetween, and frequency control means for said generator responsive to said control energy to counteract and balance said frequency departure.

GUSTAV GUANELLA.
WILLI STEINMANN.

REFERENCES CITED

The following references are of record in the file of this patent:

UNITED STATES PATENTS

| Number | Name | Date |
|---|---|---|
| 2,246,688 | Kircher | June 24, 1941 |
| 2,358,454 | Goldstine | Sept. 19, 1944 |
| 2,400,648 | Korman | May 21, 1946 |